United States Patent
Sokoly

(10) Patent No.: US 8,292,341 B1
(45) Date of Patent: Oct. 23, 2012

(54) METHOD AND RIG FOR DRAGGING A FALLEN GAME ANIMAL

(76) Inventor: Wayne Sokoly, Park Ridge, NJ (US)

( * ) Notice: Subject to any disclaimer, the term of this patent is extended or adjusted under 35 U.S.C. 154(b) by 159 days.

(21) Appl. No.: 12/824,748

(22) Filed: Jun. 28, 2010

(51) Int. Cl.
 *A45F 5/00* (2006.01)
(52) U.S. Cl. ........................................ 294/152; 224/184
(58) Field of Classification Search .................... 294/74, 294/149, 150, 152; 5/81.1 T, 89.1; 119/712, 119/725, 769, 770, 792, 814, 857, 856; 224/157, 224/184; 280/18
 See application file for complete search history.

(56) References Cited

U.S. PATENT DOCUMENTS

| | | | |
|---|---|---|---|
| 2,931,629 A * | 4/1960 | Keller | 254/409 |
| 3,547,456 A * | 12/1970 | Sapp | 280/19 |
| 3,563,208 A | 2/1971 | Nero | |
| 4,220,328 A | 9/1980 | Crush, Jr. | |
| 4,563,981 A | 1/1986 | Kramer | |
| 4,706,858 A * | 11/1987 | Whatley | 224/184 |
| 5,316,356 A | 5/1994 | Nutting | |
| 5,447,121 A | 9/1995 | Spence | |
| 5,713,497 A * | 2/1998 | Ponczek | 224/157 |
| 6,006,968 A * | 12/1999 | McCarthy et al. | 224/184 |
| 6,047,665 A | 4/2000 | Deveaux | |
| 6,089,636 A | 7/2000 | Harris | |
| 6,129,399 A | 10/2000 | Burch, Sr. | |
| D434,199 S * | 11/2000 | Alviso | D34/28 |
| 6,142,547 A | 11/2000 | Bowerman | |
| 6,422,176 B1 | 7/2002 | Tonuzi | |
| 6,755,454 B1 | 6/2004 | Cary | |
| D508,323 S * | 8/2005 | Douglas | D3/328 |
| 2008/0039003 A1 | 2/2008 | Peitz | |
| 2011/0268553 A1 * | 11/2011 | Hershberger | 414/800 |

* cited by examiner

*Primary Examiner* — Dean Kramer
*Assistant Examiner* — Stephen Vu
(74) *Attorney, Agent, or Firm* — Thomas L. Adams

(57) ABSTRACT

A fallen game animal can be dragged with a rig having a right and a left tether, both secured to the animal. The right and the left tether run alongside each other away from the fallen game animal in a direction of travel. Two or more persons, flanked by the right and the left tether, are positioned in a single file facing away from the fallen game animal. The persons use their right hands and their left hands to grip the handholds on the right tether and the left tether, respectively. Walking in single file in the direction of travel, the two persons pull the pair of tethers to drag the fallen animal. The rig can be extended to accommodate additional persons.

11 Claims, 4 Drawing Sheets

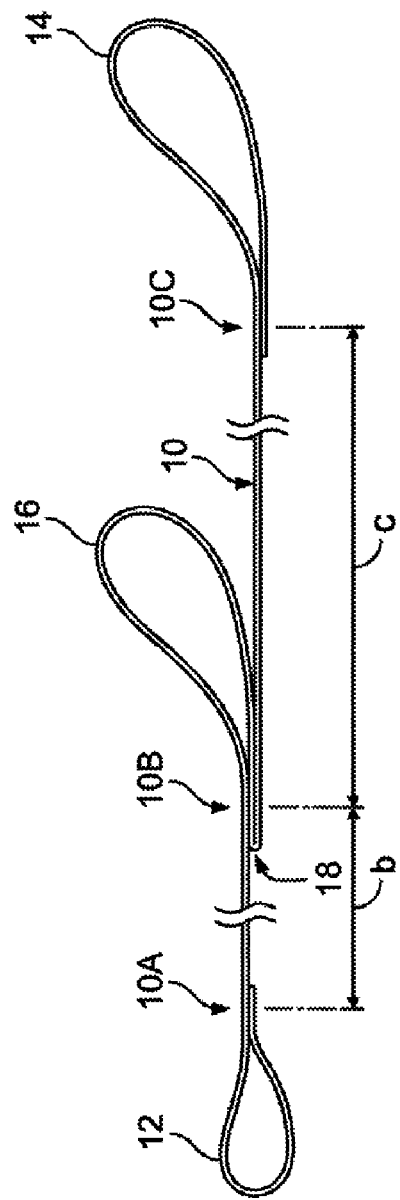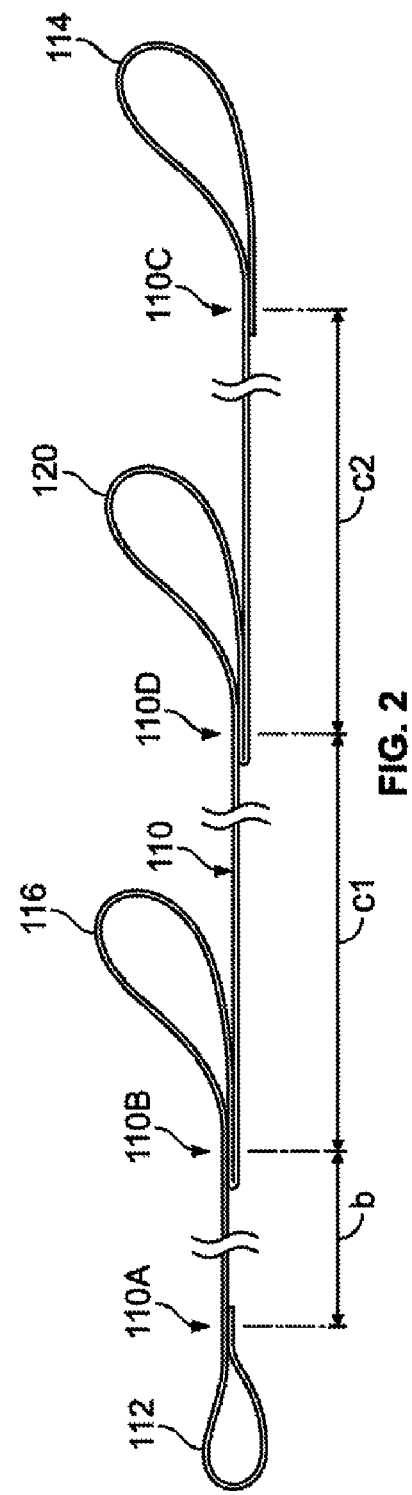

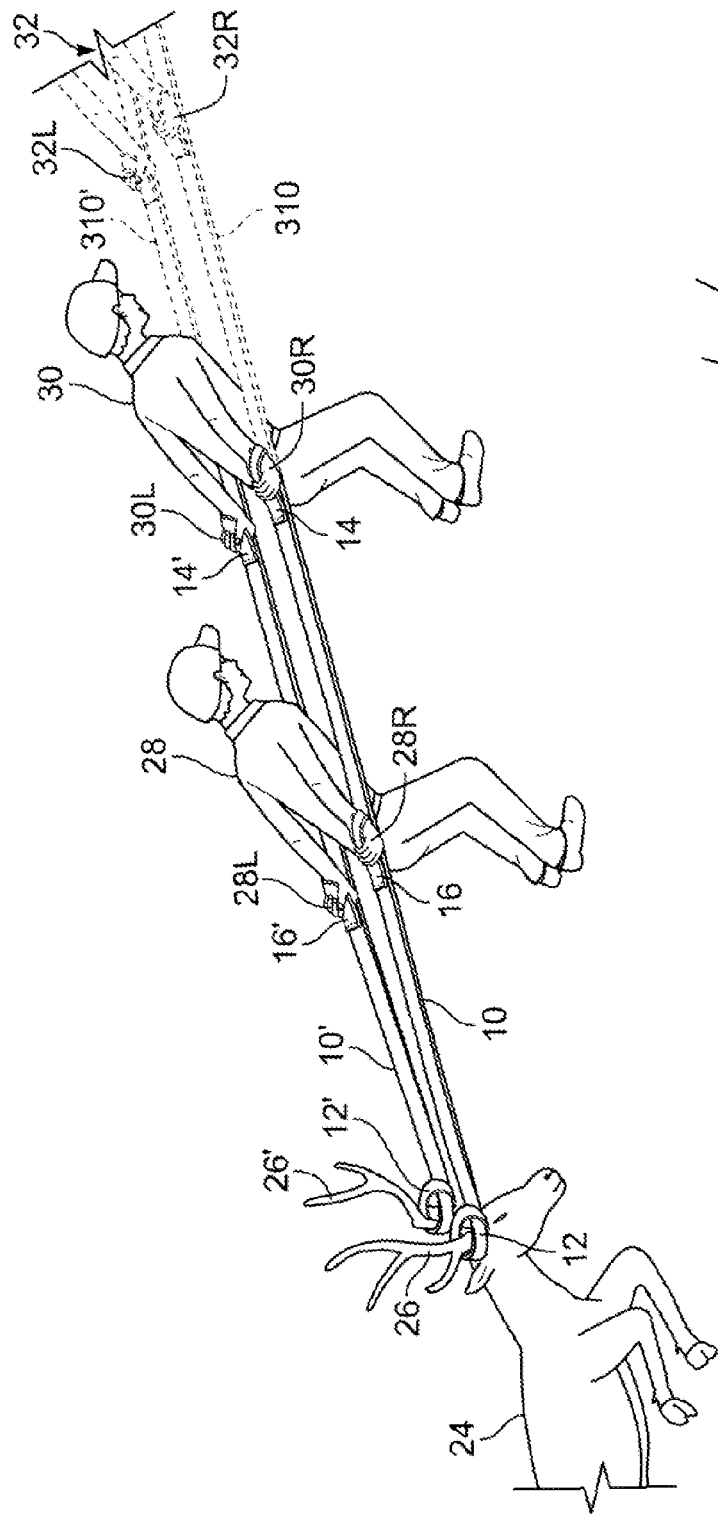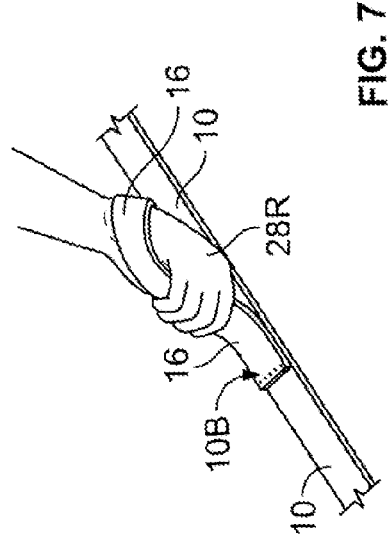

METHOD AND RIG FOR DRAGGING A FALLEN GAME ANIMAL

CROSS-REFERENCES TO RELATED APPLICATIONS

This application claims the benefit of U.S. Provisional Patent Application Ser. No. 60/668,206, filed 4 Apr. 2005, the contents of which are hereby incorporated by reference herein.

BACKGROUND OF THE INVENTION

1. Field of the Invention

The present invention relates to methods and rigs for dragging a fallen animal, and in particular, to techniques for allowing cooperative dragging by two or more persons.

2. Description of Related Art

Sport hunting is a popular recreational activity and many hunters are interested in the larger game animals such as deer, elk, moose, bear, etc. Hunting these larger game animals often requires traveling to remote areas inaccessible by vehicles and often without established trails. Once the animal is taken, transporting it back to a vehicle is a daunting task. Whitetail deer harvested in the United States can routinely range up to 200 pounds (440 kg) in weight. The average buck taken in New York and Pennsylvania, for instance, is 1.5 years old and field dresses at around 125 pounds (275 kg), according to wildlife biologist from those states.

Traveling on foot, the hunter cannot bring elaborate equipment for hauling back the fallen animal. Known dragging devices employ a rope that can be lashed to the fallen animal in order to drag it. These arrangements are designed so that the hunter will drag his quarry with a bar affixed to the other end of the rope. The fingers of the hunter's two hands will be hooked around this bar in order to exerts pressure to move the animal forward. In so dragging the animal forward, excessive stress is placed on the muscles and joints of the fingers, hand, and forearm. This technique leads to rapid finger and wrist fatigue and soreness when dragging an animal whose body weight will typically range from 80 pounds to 200 pounds (176 kg to 440 kg) over uneven, rough terrain. The stress placed on the small muscles of the fingers to maintain the connection between the hunter and quarry is excessive; especially considering the weight of the quarry will represent about 66% of the hunter's body weight. These factors are compounded by the fact that the required distance to drag the quarry to an location accessible by a motorized vehicle will typically range from 0.5 miles to 1.5 miles (0.8 km to 2.4 km). It will take a single hunter 1 to 3 hours to complete this drag depending on the factors of; animal weight, roughness of terrain, differences in elevation, physical condition of the hunter and the actual distance of the required drag. (Weight ratio: 125 pounds (deer weight):190 pounds (hunter weight), or 275 kg:418 kg; with the average weight of a male in the USA being approximately 190 pounds (418 kg). http://en.wikipedia.org/wiki/Body_weight.)

In some cases a team will drag the quarry and multiple drag lines will be provided, one for each person. Moreover, each team member will be constrained to using the same type of drag line so the members are walking roughly side-by-side. Walking side-by-side in the wilderness is difficult since the team must often navigate between closely spaced obstacles, such as closely spaced trees in a dense forest. In addition, members on the outer flanks will be pulling at an angle relative to the direction of travel and will therefore be working inefficiently.

Moreover, some of these traditional game dragging devices are drawn by hooking one's fingers around a bar and exerting pressure to move the load forward. With this method, the joints of the fingers, hand, wrist, and elbow must labor, in addition to the shoulder joint. This technique leads to rapid finger and wrist fatigue and soreness when dragging an animal whose body weight is typically 125 pounds (275 kg).

See also U.S. Pat. Nos. 3,563,208; 4,220,328; 4,563,981; 5,316,356; 5,447,121; 6,047,665; 6,089,636; 6,129,399; 6,142,547; 6,422,176; and 6,755,454, as well as US Patent Application Publication No. 2008/0039003.

SUMMARY OF THE INVENTION

In accordance with the illustrative embodiments demonstrating features and advantages of the present invention, there is provided a method of dragging a fallen game animal with a rig having a right and a left tether. The method includes the step of securing the rig to the fallen game animal. Another step is running the right and the left tether alongside each other away from the fallen game animal in a direction of travel. The method also includes the step of positioning two persons, one in front of the other, both facing away from the fallen game animal and flanked by the right and the left tether. In another step the two persons use their right hands and their left hands to hold the right tether and the left tether, respectively. The method also includes the step of the two persons walking in single file in the direction of travel and pulling the pair of tethers to drag the fallen animal.

In accordance with another aspect of the invention, a rig is provided for dragging a fallen game animal. The rig includes a right and a left tether each having a plurality of handholds, and a proximal end adapted to be secured to the fallen game animal. Thus, two persons can stand single file flanked by the right and left tethers while pulling them with both hands on the handholds.

In accordance with yet another aspect of the invention a method is provided for dragging a fallen game animal with rig having a right and a left tether, each tether having a plurality of loops. The method includes the step of tying to either the fallen game animal's neck or horns the right tether and the left tether without a direct connection between them. Another step is separately attaching to the distal end of a different corresponding one of the right and the left tether a pair of extensions, each extension having a loop. The method includes the step of running the right and the left tether alongside each other away from the fallen game animal in a direction of travel. The method also includes the step of running the pair of extensions alongside each other away from the right and the left tether in the direction of travel. Another step is positioning a first and a second person, one in front of the other, and both facing away from the fallen game animal and flanked by the right and the left tether. The method includes the step of placing a third person flanked by the pair of extensions and facing away from the fallen game animal. Another step is having the first and the second person each hold with different hands one of the plurality of loops on each of the right and the left tether. The method further includes the step of having the third person hold with different hands the loop on each of the pair of extensions. Another step is the first, the second, and the third person passing their hands through and wrapping their wrists about a corresponding one of the loops. The method also includes the step of the first, the second and the third person, spaced 3 to 6 feet apart, with their arms rotated posteriorly relative to their torso, walking in single file in the direction of travel and dragging the fallen game animal between obstacles spaced wide enough for human passage in single file but not abreast.

By employing methods and rigs of the foregoing type, an improved technique is achieved for dragging a fallen game animal. In a disclosed embodiment a pair of tethers is tied to the fallen animal, either around the neck or, if convenient, to the animal's horns. Each tether has a number of handholds, for example, straps formed into a loop. Two or more persons can then stand between the pair of tethers facing away from the animal in the direction of travel. Each person will use their right (left) hand to grab a handhold on the right (left) tether.

The team of persons can walk single file using both of their hands to drag the animal. Walking in this fashion balances the load on each person and allows the team to walk single file between obstacles. Accordingly, two or more individuals are able to walk single file through heavily wooded growth along a more direct route. The ability to walk single file effectively reduces the distance that the object needs to be pulled by up to 30%.

In a disclosed embodiment, each tether is a strap having a loop at its proximal end for forming a noose that can be secured to the fallen animal, either around the neck or horns. The distal end of each strap can also be formed into a loop large enough to act as a handhold. One or more handholds can be formed along the length of the strap. These intermediate handholds can be formed by various means, including gathering portions of the strap and stitching them together to form a loop. To use the loops as a handhold, a person can pass their hands through and wrap their wrists around a loop on the right and the left tether. Gripping the base of each loop, the person can then pull the tether in the fallen animal in the direction of travel.

The disclosed handholds are in the form of wrist straps. While previous devices place a portion of the hand, wrist, forearm or elbow under load, the disclosed wrist straps will relieve the fingers from experiencing tension as the object is hauled. The wrist strap delivers the load to the upper hand around the wrist joint, bypassing the fingers. The wrist straps, being wrapped around the user's wrists, will transfer the required dragging force to the upper arm and back muscles, and avoiding muscle tension in the forearm, wrist, and hand.

Therefore, this in-line dragging device conveniently provides for two or more persons to drag an object, single file, with greatly reduced effort and greater ease after attaching the foregoing tethers to the fallen animal. With a two-person team, pulling requirements are reduced by one half. Having two individuals drag 62.5 pounds (138 kg) versus one individual attempting to drag 125 pounds (275 kg), using the average harvested Whitetail buck weight, is physically much less demanding. This reduces the average drag burden by 50% to 33% of the average hunter's body weight. (Weight ratio: 125 pounds (deer weight):190 pounds (hunter weight), i.e., 275 kg:418 kg. The average weight of a male in the USA is approximately 190 pounds (418 kg). http://en.wikipedia.org/wiki/Body_weight.) With larger teams the pulling requirements can reduce the pulling requirements by one third, one quarter, etc.

In some cases, extensions may be used to increase the number of team members. For example, an extension similar to the foregoing tether may be attached to the distal end of a tether. A loop at the proximal end of the extension can be secured to the tether. A disclosed embodiment shows the extension being secured to an annulus mounted near the distal end of the tether.

The pair of tethers can be separate and identical, but in one embodiment they are joined together at a location between their proximal ends and the first handholds.

The present invention offers many advantages including:

The invention conveniently provides for two or more hunters to drag a fallen game animal, reducing the average drag burden by a significant amount; e.g. at least 50% to 33% of the average hunter's body weight.

The invention provides for two or more hunters to efficiently pull a fallen game animal single file through dense forest in a direct route over rough terrain.

The invention provides for greatly reduced stress placed on the small muscles of the fingers to maintain the connection between the hunter and quarry, allowing the hunters to complete the task more quickly with less stress and residual pain.

Other advantages will become apparent from reviewing the detailed description that follows.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein:

FIG. 1 is an edge view of a tether that may be used in a rig in accordance with principles of the present invention, with portions broken away for illustrative purposes;

FIG. 2 is an edge view of a tether that is an alternate to that of FIG. 1, with portions broken away for illustrative purposes;

FIG. 6 is a perspective view of a team using tethers as shown in FIGS. 1, 3 and 4 to drag a fallen animal, with extensions shown in phantom;

FIG. 7 is a detailed view of a person gripping one of the handholds of FIG. 1;

DETAILED DESCRIPTION OF THE PREFERRED EMBODIMENTS

Figure 3:
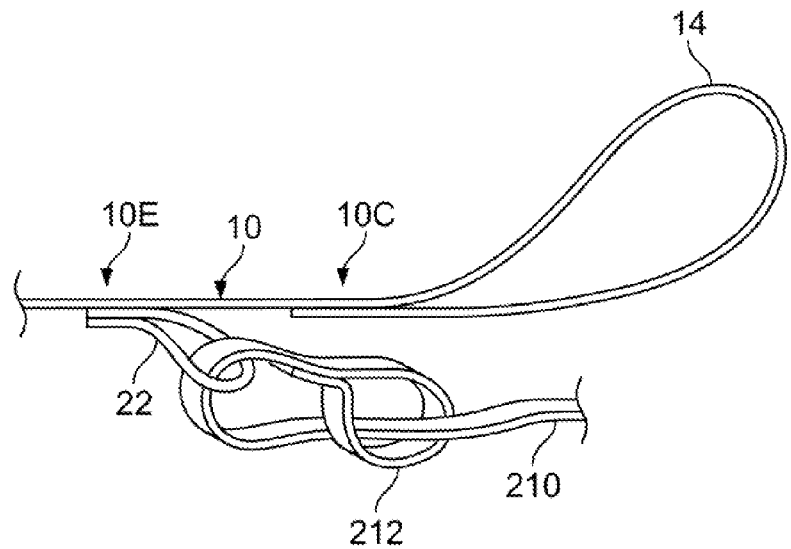
FIG. 3 is a detailed view of the distal end of a tether that is an alternate to that of FIGS. 1 and 2.

Referring to FIG. 1, the illustrated tether 10 is one of an identical pair that together form a rig. In this embodiment tether 10 is one continuous strap with its proximal end folded back and stitched at location 10A to form loop 12. Its distal end is also folded back and stitched at location 10C to form another, larger loop 14. The strap of tether 10 is gathered along its midsection to form another loop 16 that is then folded down to form bight 18. The resulting triple layer is stitched together at location 10B to fix loop 16 in place. Accordingly, tether 10 has two relatively larger loops 14 and 16 that are about the same size and can be used as a handholds, in a manner to be described presently.

While stitching was just described, in other embodiments the strap sections of tether 10 can be secured by rivets, staples, ferrules, glue, welding, nuts and bolts, or other fastening means. The strap of tether 10 can be webbing material that is knitted or woven from synthetic or natural fibers. In this embodiment the webbing is formed from polypropylene fibers, although cotton fibers, nylon fibers or other polymeric or natural fibers can be used instead. In other embodiments the strap of the tether 10 can be formed of leather, synthetic or natural rubber, a nonfibrous plastic material, composite webbing material, etc. In still other embodiments, tether 10 can be formed from a rope, chain, cable, etc., with appropriate fastening means used to form the various loops. Alternatively, the foregoing loops can be units separately made from the same or different material and then fastened appropriately to various parts of the tether 10 using, for example, the fastening methods described above.

Loops 14 and 16 were approximately 10 inches (25 cm) long in this embodiment, that is, they had a 20 inch (51 cm) circumference or perimeter. It will be appreciated that loops of different sizes can be employed in other embodiments. Since loops 14 and 16 will be used as handholds, their size can be chosen depending upon the expected size of the user's hands and by how far the user's hands ought to be from the main line of tether 10. To give an understanding of the size variability, the size of loops 14 and 16 can be changed by being doubled, halved or by being set to some size in between. In this embodiment, loop 12 is 4 inches (10 cm) long, that is, an 8 inch (20 cm) circumference or perimeter. Again, the size of loop 12 can be changed by being doubled, halved or by being set to some size in between.

Also in this embodiment, the length b of tether 10 between locations 10A and 10B is 48 inches (1.2 m) and the length c between locations 10B and 10C is 44 inches (1.1 m). Each of the lengths b and c can be varied ±2 feet (±61 cm) and not necessarily consistently (i.e., one can be increased while the other is decreased, or one can be increased/decreased while the other remains constant). Thus the length b+c can vary within a range of 44 inches (1.1 m) to 140 inches (3.6 m). The width of the strap forming tether 10 and the loops 12, 14, and 16 may be 1 inch (2.5 cm), ¾ inch (1.9 cm), or various other widths, depending upon the desired strength, weight, hand comfort, etc.

Referring to FIG. 2, the illustrated tether 110 was lengthened to include a third handhold 120. Elements in FIG. 2 corresponding to those previously illustrated in FIG. 4 have the same reference number but increased by 100. As before, tether 110 has a proximal loop 112 stitched closed at location 110A and a relatively larger loop 114 stitched closed at location 110C. The increased length of tether 110 allows the insertion of third loop 120, which is formed in the same manner as loop 116 and is stitched closed at location 110D.

Dimension b is the same as the corresponding dimension of FIG. 1. Dimension c1 is the distance between locations 110B and 110D, while dimension c2 is the distance between location 110D and 110C. Dimensions c1 and c2 each have the same characteristics as previously mentioned dimension c of FIG. 1. In a similar manner, each of the dimensions b, c1, and c2 can be changed by (1) increasing (decreasing) all of them, (2) increasing some while decreasing others, (3) increasing (decreasing) some while others remain the same, or (4) increasing one, decreasing one and leaving the other unchanged.

Referring to FIG. 3, previously mentioned tether 10 has been augmented with an auxiliary loop 22, referred to herein as a primary annulus. all this loop 22 is in the form of a fabric strap, other embodiments may a metal ring (e.g., a D-ring) held in place with a short fabric loop.

The illustrated loop 22 is stitched in place at location 10E and serves as a connection point for an extension. In this case the extension is a tether 210, which is identical to tether 10 and has been routed through loop 22. The distal end (not shown) of tether 210 has been routed through proximal loop 212 of tether 210 to form a noose or cinch. Accordingly, the handholds (not shown in this Figure) on tether 210 allow up to two more persons to pull on tether 210 and thereby exert an augmented pulling force on tether 10.

It will be understood that the distal end of tether 210 can be fitted with an auxiliary loop (i.e. a secondary annulus), similar to loop 22 of tether 10. Accordingly, a second extension can be added to the first extension 210 to allow up to six persons to apply a pulling force. Alternatively, the extension(s) can be used to allow persons to work at a greater separation by using, for example, every other set of handholds.

Figure 4:
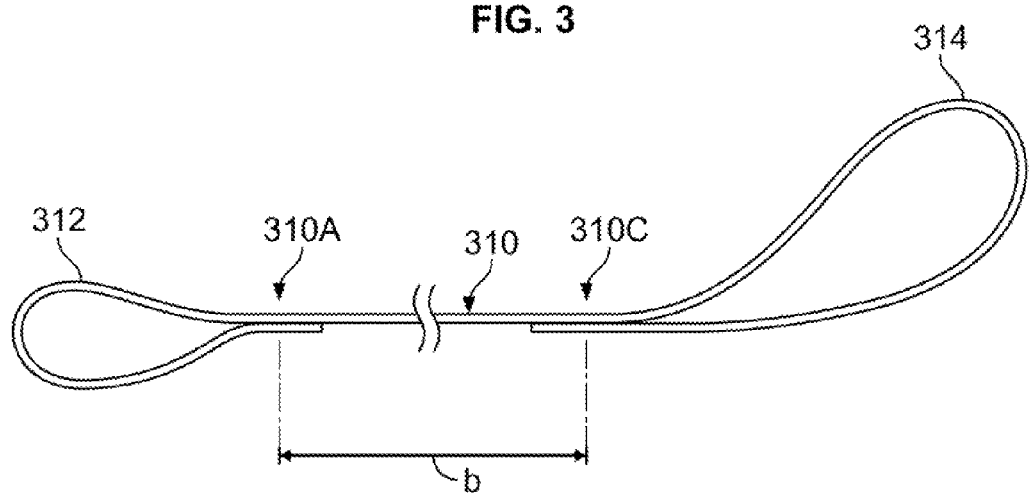
FIG. 4 is an edge view of an extension that can cooperate with the foregoing tethers, with a mid-portion broken away for illustrative purposes.

Referring to FIG. 4, another extension is shown in the form of a tether 310 that is similar to the tether 10 FIG. 1 except that its center loop 16 has been eliminated. Elements in FIG. 4 corresponding to those of FIG. 1 have the same reference numeral but raised by 300. Accordingly, extension 310 has a proximal loop 312 stitched closed at location 310A and a handhold loop 314 stitched closed at location 310C. Loop 312 may be used in a manner similar to loop 212 of FIG. 3 to connect extension 310 to another tether (e.g., tether 10 of FIG. 3). Dimension b may be the same as previously described in connection with FIG. 1.

Figure 5:
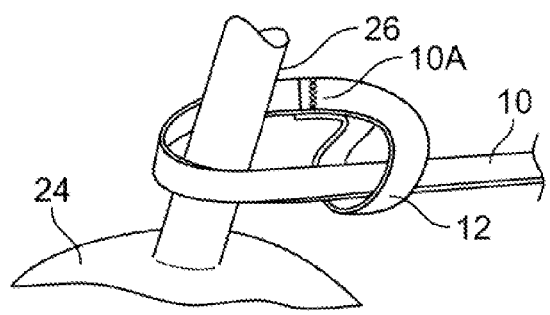
FIG. 5 is a detailed view of the proximal end of the tether of FIG. 1 being noosed about the horn of a fallen animal.

Referring to FIG. 5, element 24 represents a fragmentary view of the head of a fallen game animal that has horns, only the base 26 of one horn being visible in this Figure. Tether 10 has been routed around the horn 26. The distal end (not shown in this view) of tether 10 has been routed through loop 12 to form a noose or cinch. Accordingly, tension on tether 10 will tighten this noose on horn 26.

To facilitate an understanding of the principles associated with the foregoing apparatus, its operation will be briefly described in connection with FIGS. 1-7. As previously described in connection with FIG. 5, the proximal end of tether 10 is secured to fallen game animal 24 (here a buck) by noosing to the base of horn 26 using loop 12. Tether 10 is a right tether and cooperates with an identical tether 10', herein referred to as a left tether, to form a rig. Components of tether 10' are distinguished from those of tether 10 by being marked with a prime ('). Loop 12' is used to secure tether 10' to horn 26' by noosing, in the same manner that loop 12 was used to secure tether 10 to horn 26. Alternatively, or for animals lacking horns, loops 12 and 12' can be used to form a noose around the neck of the fallen animal.

Tether 10 and 10' are shown extending alongside each other away from animal 24 in the direction of travel. A first person 28 is shown standing, flanked by right tether 10 and left tether 10' and facing away from the fallen animal 24. The right hand 28R of person 28 is shown gripping loop 16. As shown in detail in FIG. 7, right hand 28R has passed through loop 16 so the fingers can grip the loop. Also, loop 16 is shown wrapping around the wrist of right hand 28R. Left hand 28L of FIG. 6 will be likewise disposed through loop 16'.

A second person 30 is shown standing, flanked by right tether 10 and left tether 10' and facing away from the fallen animal 24. The right hand 30R and left hand 30L of person 30 is shown gripping loops 14 and 14', respectively. Right hand 30R and left hand 30L have passed through loops 14 and 14' in the manner shown in FIG. 7. Thus, the fingers can grip the loops 14 and 14' and the loops can wrap around the wrists.

The tethers 10 and 10' will slant upwardly from animal 24 to hands 30R and 30L of person 30. To accommodate this slanting, it is desirable to place the smaller of the two persons in the position shown for person 28. This allows continued slanting so that hands 28R and 28L of person 28 are not excessively depressed to accommodate this slanting. Slanting can be affected by the spacing from person 30 to person 28, and the spacing from person 28 to fallen animal 24. Acceptable slanting is experienced when the person to person spacing is around 3 to 6 feet (0.9 to 1.8 m). Similar spacing is contemplated between person 28 and fallen animal 24.

It will be understood that each of the tethers 10 and 10' have the annulus 22 shown in FIG. 3, which is used to connect to extension 310 of FIG. 4 (the extensions shown in phantom in FIG. 6 as a right extension 310 and a left extension 310'). In particular, proximal loop 312 (FIG. 4) is inserted through annulus 22 (FIG. 3) before the distal loop 314 (FIG. 4) is inserted through loop 312 to form a noose in the manner shown in FIGS. 3 and 5. Accordingly, third person 32 (FIG. 6) can work in tandem with the other two persons 28 and 30 by pulling on the distal ends of tethers 310 and 310' (i.e., on hand loops 314 of FIG. 4).

If two additional team members are desired instead of one, extension 210 of FIG. 3 can be connected to annulus 22 as shown in FIG. 3. It will be understood that these extensions can be connected one after another to increase the size of the team as much as desired. Alternatively, extensions can be used to increase the separation between team members.

With persons 28, 30 and 32 gripping tethers 10, 10', 310 and 310' as shown, they can walk single file facing away from fallen animal 24. As they pull, the arms of persons 28, 30, and 32 will tend to rotate posteriorly relative to the torso as shown in FIG. 6. Walking in single file, team members 28, 30 and 32 can navigate between closely spaced obstacles such as trees, boulders, etc. They can also easily drag fallen animal 24 across a narrow bridge.

Also, because the load is shared among a number of persons, they can drag animal 24 further before becoming fatigued. In addition, the load on each person is balanced by being shared equally between the right and left arm. This balance also reduces stress and fatigue caused by unnatural twisting forces on the body.

Also, the load is not borne by the fingers since loops 14 and 16 wrap around the wrist as shown in FIG. 7. The wrapping of the loop around the wrist means that the fingers are not bearing the full load. Because the pulling forces are directly transferred to the arms, shoulder and upper body, fatigue is greatly reduced. The triceps and deltoid muscles in the upper arm and in the trapezius and lattissmus muscles of the back bear the force for dragging the load. With the load thus applied to the upper torso, the main work is performed by the back and legs, the strongest muscles groups.

With a tandem drag employing wrist strap devices, multiple individuals will be able to pull a relatively heavy object longer than would be possible with older designs, since the pulling force and travel time are reduced to delay the onset of fatigue.

Figure 8:
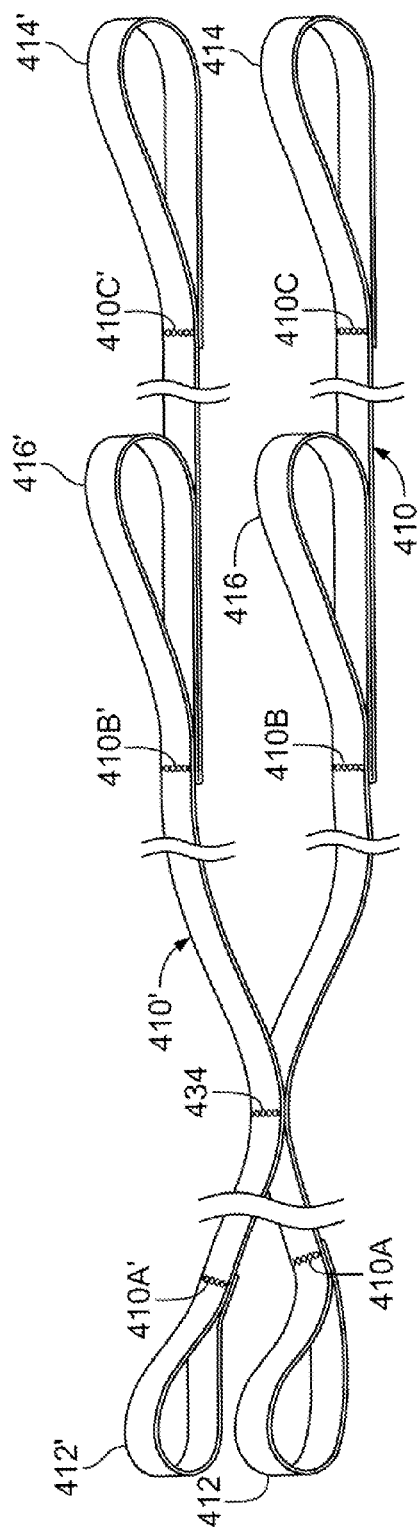
FIG. 8 is a perspective view of a pair of tethers that are an alternate to the foregoing tethers, with portions broken away for illustrative purposes.

Referring to the rig of FIG. 8, tether 410 is the same as the tether shown in FIG. 1 with one exception. Specifically, tether 410 is stitched at location 434 to an identical tether 410'. Components of tether 410 corresponding to those of the tether of FIG. 1 have the same reference numeral but increased by 400. Components of tether 410' are distinguished by being marked by a prime ('). The junction 434 of tethers 410 and 410' are spaced distally from locations 410A and 410A', respectively, approximately 12 inches (30 cm), although a difference spacing can be used in other embodiments.

Junction 434 helps to balance the tension between tethers 410 and 410'. In addition, joining the two tethers simply keeps them together so a user avoids the problem of locating one tether but not its mate.

In some embodiments loops 412 and 412' will be replaced with a single loop, in which case only a single element will extend proximally from junction 434. Alternatively, loops 412 and 412' and may be eliminated, in which case junction 434 can become part of a continuous strap running from location 410B to 410B' that is then tied to the fallen animal using ordinary tying techniques.

Figure 9:
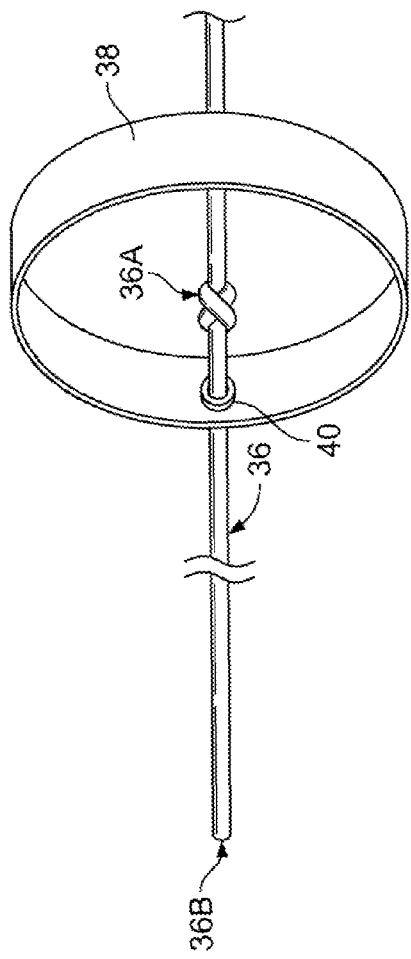
FIG. 9 is a perspective view of a tether that is an alternate to the foregoing tethers, with portions broken away for illustrative purposes.

Referring to FIG. 9, a portion of a simplified tether 36 is illustrated. Tether 36 is essentially a rope with a knot 36A tied at a location where a person may wish to hold and pull the rope. A handhold loop is formed from an endless band 38 made of a material similar to the previously described straps (e.g., the strap of FIG. 1). Rope 36 is routed through a hole in band 38, which is fitted with a reinforcing grommet 40 placed adjacent to knot 36A on the proximal side of the knot. It will be appreciated that rope 36 can have a number of additional knots, with each having a handhold similar to band 38.

The proximal end 36B of rope 36 can be tied to a fallen animal using any one of a number of familiar tying or lassoing techniques. Tether 36 can then be used as before with another identical tether to form a rig allowing a team of persons to pull the tethers with both hands while walking in single file.

It is appreciated that various modifications may be implemented with respect to the above described embodiments. While extensions and handhold loops were attached in specific ways, in other embodiments attachment can be effected by various means including snap hooks, buckles, snaps, tying cords, and loops closed by various releasable fasteners (snaps, hook and loop fasteners, etc.). Also the length of the different segments of the tethers can be adjusted with buckles, drawstrings, etc. While noosing to the fallen animal is disclosed, in other embodiments a tether can be secured to the animal in different ways, including tying cords, more elaborate harness, and loops closed by adjustable and releasable fasteners (snaps, hook and loop fasteners, etc.). The size of the handhold loops can be adjusted using buckles. Also these handholds loops can be adjusted by providing means to adjustably close a loop with fasteners such as snaps, hook and loop material, hooks and rings, etc.

Obviously, many modifications and variations of the present invention are possible in light of the above teachings. It is therefore to be understood that within the scope of the appended claims, the invention may be practiced otherwise than as specifically described.

The invention claimed is:

1. A method of dragging a fallen game animal with a rig having a right and a left tether, the method comprising the steps of:
   securing the rig to the fallen game animal;
   running the right and the left tether alongside each other away from the fallen game animal in a direction of travel;
   positioning two persons, one in front of the other, both facing away from the fallen game animal and flanked by the right and the left tether, with the right tether on the right and the left tether on the left of at least one of the two persons;
   the two persons each using the right hand and the left hand to hold the right tether and the left tether, respectively; and
   the two persons walking in single file in the direction of travel and pulling the pair of tethers to drag the fallen animal.

2. The method according to claim 1, wherein the step of securing the rig is performed by noosing them to the fallen game animal.

3. The method according to claim 1, wherein the right and the left tether are unconnected before the step of securing the rig, the step of securing the rig being performed by separately tying the right and the left tether to the fallen game animal.

4. The method according to claim 1, wherein the step of dragging is performed by dragging the fallen game animal between obstacles spaced wide enough for human passage in single file but not abreast.

5. The method according to claim 1, wherein the right and the left tether each have a spaced plurality of loops, the step of holding the right and the left tether being performed by separately passing at least some of the loops over different individual hands to wrap around a corresponding wrist.

6. The method according to claim 5, wherein said two persons are separated by 3 to 6 feet when dragging the fallen game animal.

7. The method according to claim 5, wherein said two persons have their arms rotated posteriorly relative to their torso when dragging the fallen game animal.

8. The method according to claim 7, wherein during the step of dragging the fallen game animal the right and the left tether are spread apart by the presence between them of at least one of the two persons.

9. The method according to claim 8, wherein the step of securing the rig is performed by tying the right and the left tether around either the fallen game animal's neck or horns.

10. The method according to claim 9 employing a pair of extensions, each having at least one loop, the method comprising the steps of:
    separately attaching the pair of extensions to the distal end of a different corresponding one of the right and the left tether; and
    placing a third person between the pair of extensions to hold with different hands the at least one loop on each of the pair of extensions.

11. A method of dragging a fallen game animal with rig having a right and a left tether, each with a plurality of loops, the method comprising the steps of:
    tying to either the fallen game animal's neck or horns the right tether and the left tether without a direct connection between them;
    separately attaching to the distal end of a different corresponding one of the right and the left tether a pair of extensions, each of the extensions having a loop;
    running the right and the left tether alongside each other away from the fallen game animal in a direction of travel;
    running the pair of extensions alongside each other away from the right and the left tether in the direction of travel;
    positioning a first and a second person, one in front of the other and both facing away from the fallen game animal and flanked by the right and the left tether;
    placing a third person flanked by the pair of extensions and facing away from the fallen game animal;
    having the first, and the second person each hold with different hands one of the plurality of loops on each of the right and the left tether;
    having the third person hold with different hands the loop on each of the pair of extensions;
    the first, the second, and the third person passing their hands through and wrapping their wrists about a corresponding one of the loops; and
    the first, the second and the third person, each spaced 3 to 6 feet apart from each other, with their arms rotated posteriorly relative to their torso, walking in single file in the direction of travel and dragging the fallen game animal between obstacles spaced wide enough for human passage in single file but not abreast.

* * * * *